Aug. 6, 1957 L. D. FIELD ET AL 2,801,474

DIAMETER MEASURING APPARATUS

Filed June 8, 1954

INVENTORS.
Leonard D. Field &
Sol Chidel.
BY Thiess, Olson, Mecklenburger,
von Holst, & Coltman. Attys.

United States Patent Office 2,801,474

Patented Aug. 6, 1957

1

2,801,474

DIAMETER MEASURING APPARATUS

Leonard D. Field and Sol Chidel, Chicago, Ill.

Application June 8, 1954, Serial No. 435,325

2 Claims. (Cl. 33—178)

This invention relates to improved apparatus for measuring diameters and more particularly to an improved hand manipulated gage for indicating the end diameter of a substantially round aperture or bore.

It is an important object of this invention to provide improved apparatus for accurately measuring the diameter of a round aperture or bore at the end thereof.

In industry it is frequently necessary to provide an accurately chamfered or countersunk round aperture whereby the terminal portion of said aperture is adapted to receive a flat headed screw or the like. Other typical uses of noncylindrical portions of apertures are for the accommodation of various noncylindrical machine elements such as tapered rivets, pins and the like. To accurately fit the noncylindrical element into an appropriate aperture it is required that the inner and outer diameters of the aperture be accurately measured. In the typical example of a countersunk hole the inner diameter will be the same as the hole diameter and by determining the outer diameter of the tapered portion and the length of the portion, the angle of the countersink can readily be calculated. A machine element may then be cut in conformance with these measurements and calculations to provide the desired intimate fit.

It is therefore a further object of this invention to provide improved apparatus for determining the outer diameter of a tapered portion of an elongated generally round bore.

It is another object of this invention to provide an improved diameter gage capable of calibration without the use of complex master apertures but only a flat surface.

It is a further object of this invention to provide improved apparatus for determining the outer diameter of round apertures and bores, said apparatus being adapted for hand operation.

It is another object of this invention to provide an improved diameter gage which is adapted for accurate measurements and quick operation.

It is another object of this invention to provide an improved diameter gage which is automatically reset after a gaging operation, is of a simple construction and is capable of measurements over an extended range.

It is still another object of this invention to provide an improved diameter gage having an adjustable zero or datum value.

Further and additional objects of this invention will become manifest from a consideration of this description, the accompanying drawings and the appended claims.

In one form of this invention a gage is provided having a gage pin with a forward section describing a generally conic configuration. The pin is slidably mounted in a tubular housing having a flat ground surface at one end thereof so that the conic portion of the pin extends through an appropriate aperture in the ground surface. The other end of said pin is adapted to actuate an indicating device mounted on the housing and having a spring continuously urging the gage pin outwardly through the aperture in the flat end surface of said housing.

2

For a more complete understanding of this invention reference will now be made to the accompanying drawings, wherein Fig. 1 is a front elevational view of one embodiment of this invention;

Figure 1:
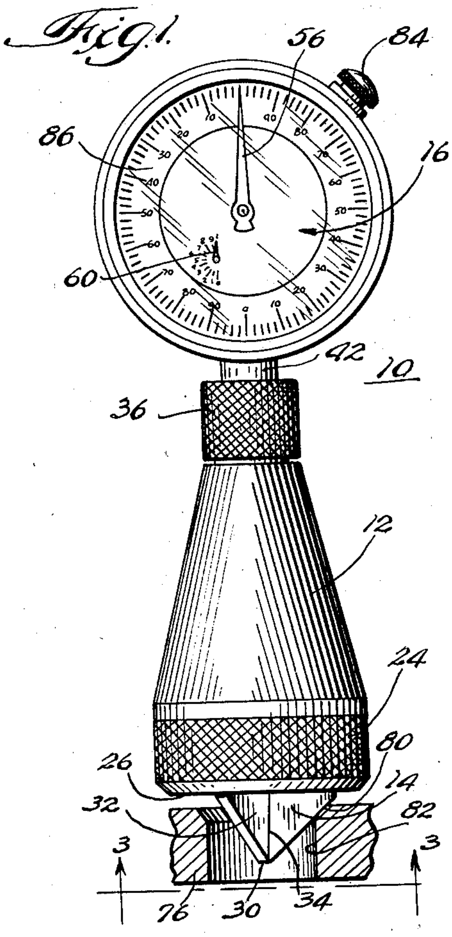
Figure 2:
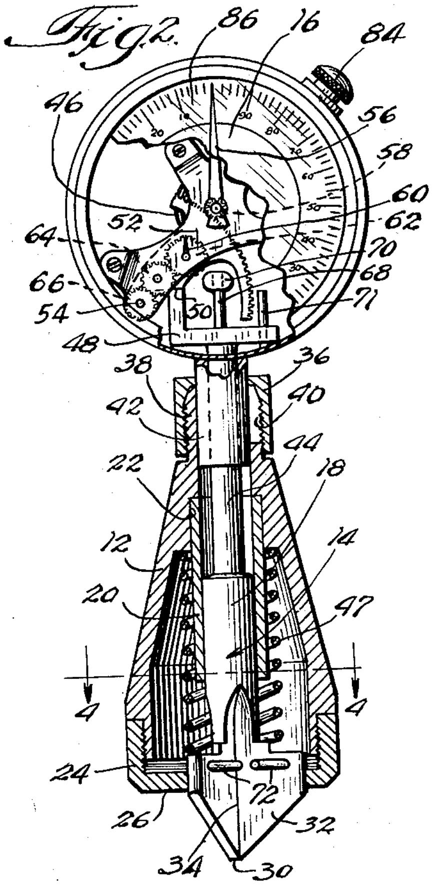
Fig. 2 is a front elevational view of the embodiment of Fig. 1, partially in section.

Referring now to the drawings and more particularly to Figs. 1 and 2, a gage 10 is illustrated comprising generally a tubular housing 12 having a gage pin 14 extending from one end thereof and a dial indicator 16 mounted at the other end thereof. The gage pin 14 has a cylindrical portion 18 which is slidable in a cylindrical steel bushing 20 accurately formed to closely coincide to the diameter of the pin. The steel bushing 20 is pressed into recess 22 formed in the upper portion of housing 12 and an end cap 24 threadedly engages the lower portion of the housing 12. Cap 24 has a flat planar portion 26 which is accurately ground and maintained in normal relationship to the axis of gage pin 14.

Figure 3:
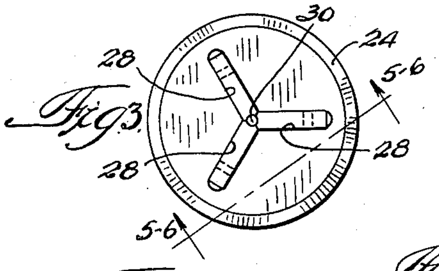
Fig. 3 is a bottom plan view of the housing and gage pin of the described embodiment of this invention.
Figure 4:
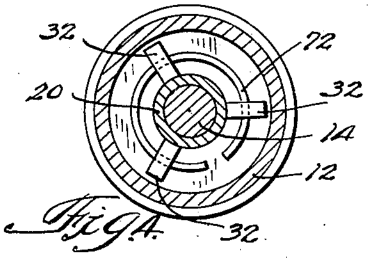
Fig. 4 is an illustration in section of the housing and gage pin construction taken along the line 4—4 of Fig. 2.

As shown most clearly in Fig. 3, the cap 24 has three slots 28 formed therein having a central portion in common whereby the free end of the gage pin 14 is slidable in said slots. The free end of gage pin 14 is formed of three blades 32 having a common central portion 34, each of the blades having a vertex angle of 45°. Thus, it will be clear that the three blades, each having a vertex angle of 45°, define generally a conic section having an apex angle of 90°. The significance of this particular angular relationship will be apparent from the description of the operation of the subject gage which follows. A flat portion 30 is provided at the end of the plunger 14 to facilitate calibration of the device. By placing the gage on an accurate flat surface and pressing down to effect full retraction of the plunger 14 the flat end 30 of the plunger 14 will be coplanar with the flat surface 26 and the dial should read a predetermined known value under these conditions. Heretofore, it has been necessary to provide an apertured plate for calibration purposes as the pointed portion of the plunger could not be maintained dimensionally exact.

Referring to Fig. 2 a smaller cap 36 is secured at the upper end of housing 12 by threaded engagement with a reduced portion 38 thereof. The reduced portion 38 has a plurality of longitudinal cuts 40 formed therein whereby tightening of the cap 36 on the housing 12 will effect inward motion of the furcate end portion 38 of the housing to frictionally engage a hollow stem 42 of the dial indicator gage 16. The gage pin 14 is resiliently engaged by an indicator pin 44 which is slidable in sleeve 42, and urged downwardly by a helical spring 47 compressed between the plunger 14 and the housing 12. The dial indicator 16 also has an internal spiral spring 46 which continuously urges the indicator pin 44 into engagement with plunger 14. While one particular gage mechanism is herein shown and described, it will be clear from the description that any of the various dial indicating gages commercially available may readily be adapted for use in apparatus as taught by this invention. Herein an anvil 48 is secured to the end of indicator pin 44 and engages a foot 50 of a gear segment 52 which is pivotally mounted about pin 54. As the indicator pin 44 is urged upwardly by the gage pin 14 the anvil 48 will force gear segment 52 in a counterclockwise direction and will thus rotate spur gear 58 in a clockwise direction. An indicating hand 56 is fixed to a rotatable shaft in common with the spur gear 58 and thus indicates the degree of rotation thereof. In the embodiment illustrated the indicating hand 56 is adapted for multiple rotation and the number of rotations thereof are indicated on a smaller hand 60. Hand 60 is directly driven by a gear train including gear 62 fixed to a common shaft with hand 60, an idler gear 64 in engagement with gear 62, and a driving gear 66 which is fixed to shaft 54.

Guide pin 68 extends upwardly from anvil 48 and passes through an apertured guide 70 fixed in the indicator 16, and a second guide pin 71 is fixed to the shell of the indicator and passes through an aperture in the anvil to provide additional guide means and a restraining force to prevent rotation of the anvil. A retaining ring 72 is provided extending through appropriate apertures in the blades 32 of the gage pin 14 to limit the outward movement of the gage pin under the influence of spring 47.

Figure 5:
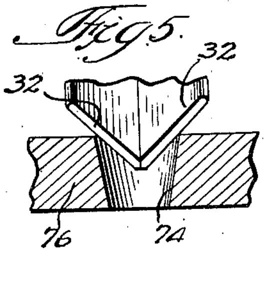
Fig. 5 illustrates diagrammatically the use of the described embodiment on a tapering round aperture and is in section taken along the line 5—5 of Fig. 3.
Figure 6:
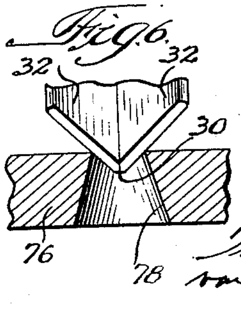
Fig. 6 illustrates the described embodiment in use on a converging tapered round aperture and is in section taken along the line 6—6 of Fig. 3.

The manner in which the described gage functions will be clear from a consideration of Figs. 5 and 6. In Fig. 5 the blades 32 of the gage are shown in engagement with the outer edge of a tapered aperture 74 in a piece of material 76, while in Fig. 6 the blades 32 are shown in engagement with a convergent portion of an aperture 78 formed in the material 76. Irrespective of the shape of the aperture the penetration of the blades into said aperture will be determined by the outermost diameter thereof. This is true provided only that the walls of the aperture at the outer portion thereof diverge by no more than 45° from the aperture axis.

Referring once again to Fig. 1 the gage 10 is shown in engagement with a countersunk portion 80 of an otherwise cylindrical aperture 82 in the sheet material 76. It will be seen that the housing 12 is engaged by the hand of an operator and is forced downwardly until the planar surface 26 engages the uppermost surface of stock 76. This motion of the housing will be in opposition to the spring 47 and will cause the indicator hands 56 and 60 to rotate. The degree of rotation is determined by the overall length of the gage blades 32 less the portion of the gage blades which extend into the aperture. This, it will be understood, bears a known relationship to the diameter of the hole, the exact relationship being determined by the apex angle of the gage. In this embodiment the apex angle is 90° so that an extension of the gage pin of, for example, .25 inch will indicate an outer diameter of the aperture of twice that amount, or .5 inch.

The dial face is calibrated with 200 equal divisions about the periphery thereof in the particular embodiment described and each division represents .0005 inch of vertical travel and consequently .001 inch of diameter. Each revolution of the indicator thus represents .2 inch of diameter and a complete range of measurements in the particular embodiment described is equivalent to five revolutions of the gage or one inch of aperture diameter. It will be clear that the teaching of this invention may be modified to accommodate any range of diameters desired.

A knob 84 is provided in the indicator housing 16 and rotatably moves an annular face portion 86 bearing the indicia for the indicator. Knob 84 thus provides an accurate adjustment of the zero or datum value of the gage. If it were desired to rapidly gage a multiplicity of parts having an identical aperture therein it would, therefore, be possible to adjust the knob 84 so that the indicator would read zero when the apertures were of proper diameter and would indicate plus or minus a number of divisions on the face of the dial equal to the error in the aperture in parts which did not absolutely conform to the specification. This would provide a quick means of checking production parts and would require less skill on the part of the operator.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. Diameter measuring apparatus comprising an elongate housing having a slotted planar surface at one end thereof normal to the axis of said housing, a plurality of rigid radial blades having a common edge and forming a gage member defining a conic section slidably mounted in said housing for linear motion along said axis, said gage member extending through a plurality of slots in said planar surface corresponding to said blades, a shaft extending into said housing along said axis and integral with said gage member, a cylindrical bushing secured in said housing on said axis and receiving said shaft in slidable relationship therein, resilient means in said housing surrounding said bushing and compressed between said housing and said gage member whereby said gage member is normally urged outwardly from said slotted planar surface, dial indicator means secured in said housing at the other end thereof, said dial indicator means having a linearly movable operator disposed on said axis and normally in engagement with said shaft, the other end of said housing having means thereon to removably support said dial indicator in position in alignment with said axis.

2. Diameter measuring apparatus comprising an elongate housing having a slotted planar surface at one end thereof normal to the axis of said housing, a plurality of rigid radial blades having a common edge and forming a gage member defining a conic section slidably mounted in said housing for linear motion along said axis, said gage member extending through a plurality of slots in said planar surface corresponding to said blades, a shaft extending into said housing along said axis and integral with said gage member, a crylindrical bushing secured in said housing on said axis and receiving said shaft in slidable relationship therein, resilient means in said housing surrounding said bushing and compressed between said housing and said gage member whereby said gage member is normally urged outwardly from said slotted planar surface, dial indicator means secured in said housing at the other end thereof, said dial indicator means having a linearly movable operator disposed on said axis and normally in engagement with said shaft, the other end of said housing having means including a slotted cylindrical portion and a threaded nut engageable therewith to effect inward radial compression thereof to removably support said dial indicator in position in alignment with said axis.

References Cited in the file of this patent

UNITED STATES PATENTS

| | | |
|---|---|---|
| 1,459,896 | John | June 26, 1923 |
| 2,316,877 | Maag | Apr. 20, 1943 |
| 2,462,545 | Penjaska | Feb. 22, 1949 |
| 2,600,498 | Hamerly et al. | June 17, 1952 |
| 2,632,955 | Samuelson | Mar. 31, 1953 |
| 2,758,383 | Breit | Aug. 14, 1956 |